United States Patent
Lim et al.

(10) Patent No.: US 12,545,083 B2
(45) Date of Patent: Feb. 10, 2026

(54) METHOD FOR PROVIDING VEHICLE DECONTAMINATION AND SYSTEM FOR THE SAME

(71) Applicant: HYUNDAI MOBIS CO., LTD., Seoul (KR)

(72) Inventors: Hyun Jun Lim, Anyang-si (KR); Yu Jin Jung, Seoul (KR); Ki Hee Park, Gwacheon-si (KR); Jong Ho Hwang, Seoul (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 663 days.

(21) Appl. No.: 18/068,013

(22) Filed: Dec. 19, 2022

(65) Prior Publication Data

US 2023/0219400 A1 Jul. 13, 2023

(30) Foreign Application Priority Data

Jan. 11, 2022 (KR) .................. 10-2022-0004037

(51) Int. Cl.
*B60H 3/00* (2006.01)
*B60H 3/02* (2006.01)
*B60S 1/64* (2006.01)

(52) U.S. Cl.
CPC ........... *B60H 3/0085* (2013.01); *B60H 3/022* (2013.01); *B60S 1/64* (2013.01)

(58) Field of Classification Search
CPC .. B60H 1/00785; B60H 1/008; B60H 3/0085; B60H 3/022; B60H 3/0078; F24F 2110/60; F24F 2110/64; F24F 2130/10; B08B 3/00; B08B 5/04; B08B 2230/01; B08B 7/028; B60S 1/64; A61L 9/14; A61L 9/015; A61L 2209/111; A61L 2209/16
See application file for complete search history.

(56) References Cited

U.S. PATENT DOCUMENTS 9,764,623 B2 * 9/2017 Fruehsorger ......... B60H 3/0078

* cited by examiner

*Primary Examiner* — Allen R. B. Schult
(74) *Attorney, Agent, or Firm* — NovoTechIP International PLLC

(57) ABSTRACT

A method for performing vehicle decontamination includes receiving a decontamination request signal; monitoring a pollution level of inside air of a vehicle through a sensing unit that includes a fine dust sensor, an olfactory sensor, and a humidity sensor, according to the decontamination request signal; determining whether decontamination of the inside air of the vehicle is necessary according to the result of monitoring of the sensing unit; and when the decontamination of the inside air of the vehicle is necessary, performing a decontamination mode through a driving unit that includes a vehicle seat, an ultrasonic output device, an air-conditioner, and a steam supply device.

20 Claims, 5 Drawing Sheets

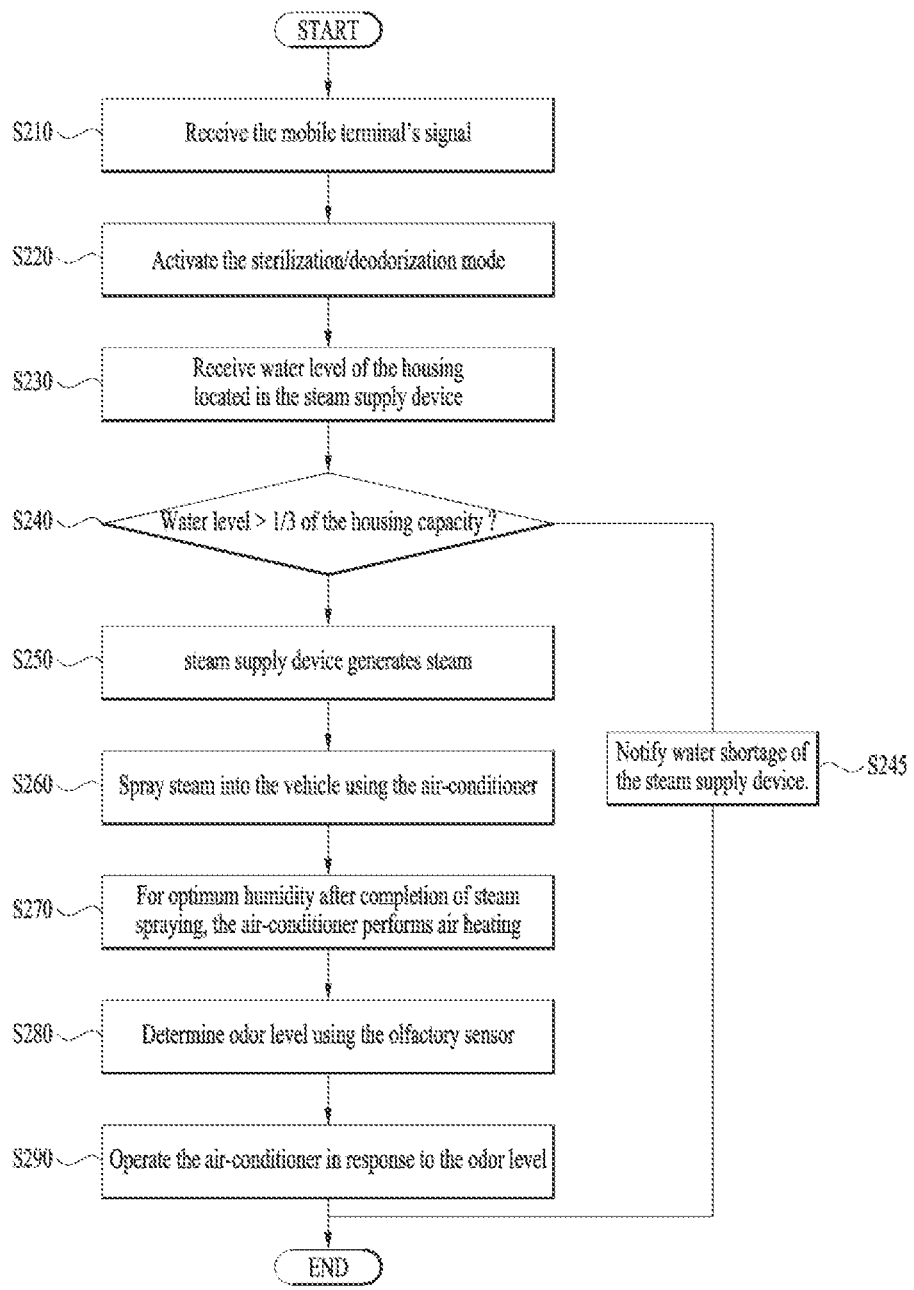

METHOD FOR PROVIDING VEHICLE DECONTAMINATION AND SYSTEM FOR THE SAME

CROSS-REFERENCE TO RELATED APPLICATIONS

Pursuant to 35 U.S.C. § 119(a), this application claims the benefit of Korean Patent Application No. 10-2022-0004037, filed on Jan. 11, 2022, which is hereby incorporated by reference as if fully set forth herein.

TECHNICAL FIELD

The present disclosure relates to a method for performing vehicle decontamination and a system for the same, and more particularly to a method for decontaminating a vehicle that performs a decontamination function by receiving a decontamination signal, and a system for the same.

BACKGROUND

Generally, an evaporator of an air-conditioner installed in the vehicle is always in a damp state because water droplets are formed on the evaporator. When the air-conditioner is used in the vehicle, foreign substances in air being introduced in the air-conditioner are attached to water droplets, so that the evaporator has ideal condition for growth of mold and bacteria. Since harmful substances produced by these molds and bacteria are discharged into the interior space of the vehicle through an outlet of the air-conditioner, an unpleasant odor may occur in the vehicle.

In addition, when polluted air from automobile exhaust gas, dust, and soot generated by incineration of garbage is introduced into the interior of the vehicle according to industrial development, it causes discomfort to a vehicle driver and reduces concentration of vehicle occupants including the driver, resulting in a higher possibility of causing respiratory infection among vehicle occupants. Specifically, such polluted air is harmful to the health of people with allergies or weakened immune systems.

On the other hand, a vehicle interior ventilation method using the related art describing a system for cleaning and ventilating vehicle interior air may measure the degree of pollution of the inside air of the vehicle and the degree of contamination of the outside air of the vehicle, may compare the measured degrees of pollution of the interior and exterior air of the vehicle with each other, and may determine whether to ventilate the inside air of the vehicle or whether to introduce the outside air into the interior of the vehicle according to the result of comparison. As a result, the aforementioned vehicle interior ventilation method can perform air ventilation of the vehicle or can display the degree of pollution of the interior or exterior air of the vehicle.

However, the above-described related arts disclose only technology of ventilating air of the vehicle by monitoring the degree of pollution of the inside air of the vehicle, and do not propose a method for easily managing the vehicle using a function for removing fine dust from the vehicle as well as sterilization/deodorization functions of the vehicle.

SUMMARY

Accordingly, embodiments of the present disclosure are directed to a method for performing vehicle decontamination and a system for the same, which can substantially obviate one or more problems due to limitations and disadvantages of the related art.

To solve the above-described problems, an object of the present disclosure is to provide a method for performing vehicle decontamination for vehicle and personal hygiene management and a system for the same, which can remove fine dust, can sterilize harmful bacteria and viruses, and can deodorize the air of the vehicle by using vehicle vibration, ultrasonic waves, and steam based on the concentration of fine dust in the vehicle.

Technical tasks obtainable from the present disclosure are non-limited by the above-mentioned technical tasks. In addition, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a method for performing vehicle decontamination may include receiving a decontamination request signal; monitoring a pollution level of the inside air of a vehicle through a sensing unit that includes a fine dust sensor, an olfactory sensor, and a humidity sensor, in response to the decontamination request signal; determining whether decontamination of the inside air of the vehicle is necessary based on the result of monitoring of the sensing unit; and when the decontamination of the inside air of the vehicle is necessary, performing a decontamination mode of operation through a driving unit that includes a vehicle seat, an ultrasonic output device, an air-conditioner, and a steam supply device.

In some implementations, receiving the decontamination request signal may include receiving at least one of a fine dust removal request and a sterilization/deodorization request.

In some implementations, the method may further include, when the contamination request signal includes the fine dust removal request, measuring information on fine dust concentration of the inside air of the vehicle through the fine dust sensor; and receiving information on fine dust concentration of outside air of the vehicle from a meteorological agency server.

In some implementations, determining whether decontamination of the inside air of the vehicle is necessary may include, when the fine dust concentration of the inside air of the vehicle exceeds the fine dust concentration of the outside air of the vehicle, determining that fine dust removal is necessary.

In some implementations, performing the decontamination mode of operation may include performing, by the vehicle seat, a fine dust removal operation; outputting, by the ultrasonic output device, ultrasonic waves in a manner that the fine dust is aggregated; and discharging, by the air-conditioner, the aggregated fine dust to the outside of the vehicle.

In some implementations, the method may further include: upon receiving the sterilization/deodorization request, detecting a water level of the steam supply device.

In some implementations, determining whether decontamination of the inside air of the vehicle is necessary may include, when the water level of the steam supply device exceeds a predetermined threshold, determining that sterilization and deodorization of the inside air of the vehicle are possible.

In some implementations, performing the decontamination mode of operation may include generating, by the steam supply device, steam by heating water; spraying, by the air-conditioner, the generated steam into the vehicle; and heating, by the air-conditioner, the inside air of the vehicle in a manner that the air-conditioner allows the heated air to have a preset humidity based on humidity information measured by the humidity sensor.

In some implementations, the method may further include, when the air-conditioner performs adjustment for the preset humidity, measuring, by the olfactory sensor, an odor level of the inside air of the vehicle; and deodorizing, by the air-conditioner, the inside air of the vehicle based on the measured odor level.

In some implementations, determining whether decontamination of the inside air of the vehicle is necessary may include: when a water level of the steam supply device does not exceed a predetermined threshold, outputting a message for indicating a water shortage of the steam supply device.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 5 is a flowchart illustrating a sterilization/deodorization method from among vehicle decontamination methods according to an embodiment of the present disclosure.

DETAILED DESCRIPTION

Figure 1:
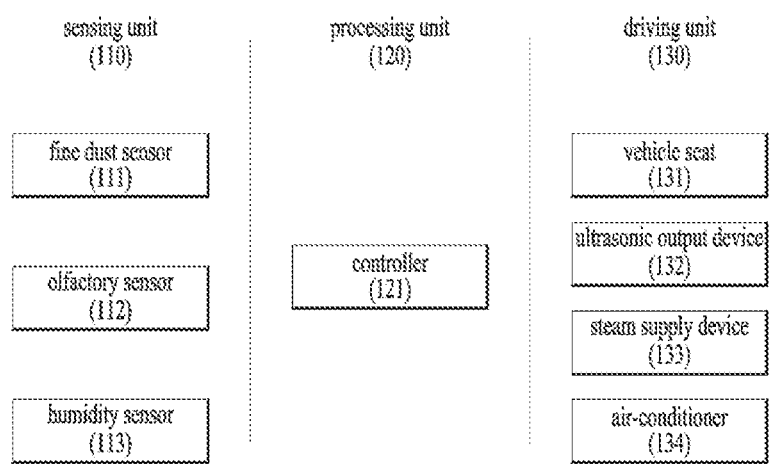
FIGS. 1 and 2 are diagrams illustrating a vehicle decontamination system according to an embodiment of the present disclosure.

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part "includes" an element, it means that the part may further include another element rather than excluding another element unless otherwise mentioned.

Figure 2:
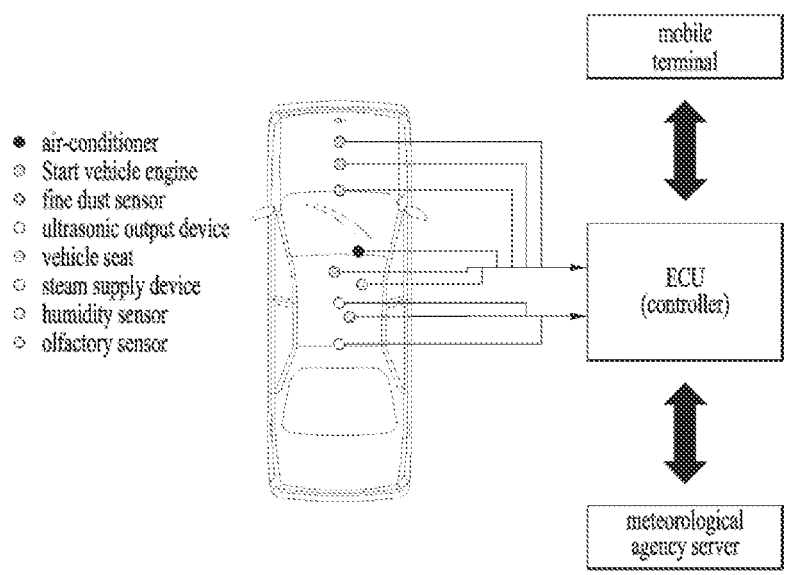

FIGS. 1 and 2 are block diagrams illustrating a vehicle decontamination system according to an embodiment of the present disclosure.

Referring to FIG. 1, the vehicle decontamination system according to the present embodiment may include a sensing unit 110 for monitoring a pollution level of the inside air of the vehicle. The sensing unit 110 may include a fine dust sensor 111, an olfactory sensor 112, and a humidity sensor 113 as basic configurations for determining the degree of pollution of the inside air of the vehicle. In more detail, the fine dust sensor 111 may measure the concentration of fine dust present in the inside air of the vehicle, the olfactory sensor 112 may be configured to acquire odor level information of the inside air of the vehicle, and the humidity sensor 113 may be configured to acquire humidity level information of the inside air of the vehicle.

On the other hand, as shown in FIG. 1, a processing unit 120 according to the present embodiment may include a controller 121 for determining whether decontamination of the inside air of the vehicle is necessary according to the pollution level monitoring result obtained by the sensing unit 110. The controller 121 may also be referred to as an electronic control unit (ECU) as shown in FIG. 2. The controller 121 according to the present embodiment may control the sensing unit 110 to periodically/continuously monitor the pollution level of the vehicle air before the driver rides in the vehicle or after the driver alights from the vehicle.

A driving unit 130 according to the present disclosure may include a vehicle seat 131, an ultrasonic output device 132, a steam supply device 133, and an air-conditioner 134.

The vehicle seat 131 may include various functions for dusting off fine dust accumulated on the surface of the seat, for example, a function for automatically moving the seat in a forward or backward direction, a function for moving a backrest of the seat in a forward or backward direction, a self-vibration function (using the existing massage function), and a ventilation (or air-blowing) function.

The ultrasonic output device 132 may output ultrasonic waves to agglomerate fine dust particles by applying strong sound wave energy to the fine dust particles in the vehicle.

The steam supply device 133 may include a housing unit for storing and moving water, a heater unit for heating water, and an alarm unit for notifying a user of a lack of water. For example, water in the steam supply device 133 needs to be continuously charged in a general internal combustion engine vehicle, and may be defined by utilizing water generated in a hydrogen electric vehicle.

The air-conditioner 134 may spray steam generated by the steam supply device 133 into the vehicle by utilizing the inside/outside air of the vehicle. In this case, the air-conditioner 134 may spray the steam to all interior parts of the vehicle using the existing air-conditioner capable of cooling/heating the inside air of the vehicle. In this case, when the steam is sprayed in one direction, mats and seats of the vehicle may be damaged, so that the air-conditioner 134 may automatically rotate in up/down/left/right directions to prevent damage to the mats and seats of the vehicle.

In addition, after steaming is completed, the air-conditioner 134 may activate the heating function to dry the moisture generated by such steam in consideration of the possibility of causing mold to grow on leather products of the vehicle.

Referring to FIG. 2, the vehicle decontamination system may be connected to a mobile terminal and a weather server which are located outside the vehicle.

The vehicle decontamination system according to the present disclosure may include a communication unit (not shown). The communication unit may receive data for remotely driving the system through wireless communication before the user (i.e., the driver) of the vehicle rides in the vehicle or after the user leaves the vehicle. The communication unit may receive a decontamination request signal from a mobile terminal of the user. The decontamination request signal may include at least one of a fine dust removal signal and a sterilization-deodorization signal.

Mobile terminals described herein may include a cellular phone, a smartphone, a laptop, a digital broadcasting terminal, a personal digital assistant (PDA), a portable multimedia player (PMP), a navigation system, a slate PC, a tablet PC, an ultrabook, and wearable devices (for example, a smartwatch, smartglasses, a head mounted display (HMD), and the like).

Meanwhile, the vehicle decontamination system may acquire the fine dust concentration corresponding to the position of the vehicle from the Meteorological Agency server. Here, the vehicle position information may be based on GPS information. In the embodiment for additionally utilizing weather information as described above, the controller 121 may be configured to differently determine the degree of pollution of the outside air of the vehicle according to weather information corresponding to the vehicle position.

In addition, the Meteorological Agency server may provide real-time weather information as well as the above-described weather information, which can be obtained and utilized through the communication unit of the present embodiment.

The controller 121 of the vehicle decontamination system may acquire the fine dust concentration corresponding to the vehicle position from the mobile terminal through the communication unit. Here, the vehicle position information may be based on GPS information. In the embodiment that additionally utilizes the weather information as described above, the controller 121 may be configured to differently determine the fine dust concentration of the vehicle according to weather information corresponding to the vehicle position.

In addition, the Meteorological Agency server may provide real-time weather information as well as the above-described weather information, which can be obtained and utilized through the communication unit of the present embodiment.

Referring back to FIG. 1, in order for the controller 121 to determine whether the fine dust needs to be removed according to a fine dust removal request from the vehicle, the controller 121 may determine whether to remove fine dust based on the fine dust concentration of the inside air of the vehicle and the fine dust concentration of the outside air of the vehicle. Here, the fine dust concentration of the inside air of the vehicle can be sensed by the fine dust sensor 111, and the fine dust concentration of the outside air of the vehicle can be obtained through the Meteorological Agency server.

For example, when the fine dust concentration of the inside air of the vehicle is greater than the fine dust concentration of the outside air of the vehicle, the controller 121 may determine that fine dust removal is necessary.

When fine dust removal is necessary, the controller 121 may control the vehicle seat 131 to operate so that fine dust can be removed from the seat disposed in the vehicle.

Thereafter, the controller 121 may control the ultrasonic output device 132 to apply strong sound wave energy to fine dust particles in the vehicle. As a result, the fine dust particles in the vehicle are aggregated, and the diameter of each fine dust particle is increased to a removable size.

Subsequently, the controller 121 may collect fine dust in the vehicle by utilizing the inside air of the vehicle through the air-conditioner 134. The air-conditioner 134 may discharge the fine dust collected through the outside air of the vehicle to the outside.

In addition, in order to determine whether sterilization and deodorization of the air are required according to the sterilization/deodorization request from the vehicle, the controller 121 may be configured to determine whether sterilization and deodorization of the air are necessary based on water level information of the steam supply device 133 of the vehicle.

For example, the controller 121 may determine that steam can be supplied into the vehicle when the water level of the steam supply device 133 exceeds a predetermined threshold.

Thereafter, when steam can be supplied into the vehicle, the controller 121 may control the heater of the steam supply device 133 to heat water, resulting in generation of steam.

Thereafter, the controller 121 may control the generated steam to be sprayed into the vehicle. The controller 121 may spray the steam into the vehicle using the air-conditioner 134.

After the steam was sprayed into the vehicle, the controller 121 may control the humidity sensor 113 to measure humidity of the inside air of the vehicle. Then, the controller 121 may control the air-conditioner 134 to heat the inside air of the vehicle in a manner that the resultant air has a preset optimum humidity based on the measured humidity.

Subsequently, the controller 121 may measure the odor level of the inside air of the vehicle using the olfactory sensor 112. The controller 121 may control the sterilization/deodorization mode according to the measured odor level.

On the other hand, when the water level of the steam supply device 133 is less than a predetermined threshold, the controller 121 may determine that it is impossible to supply steam to the inside of the vehicle. Accordingly, the controller 121 may output a message for indicating a water shortage of the steam supply device 133.

Figure 3:
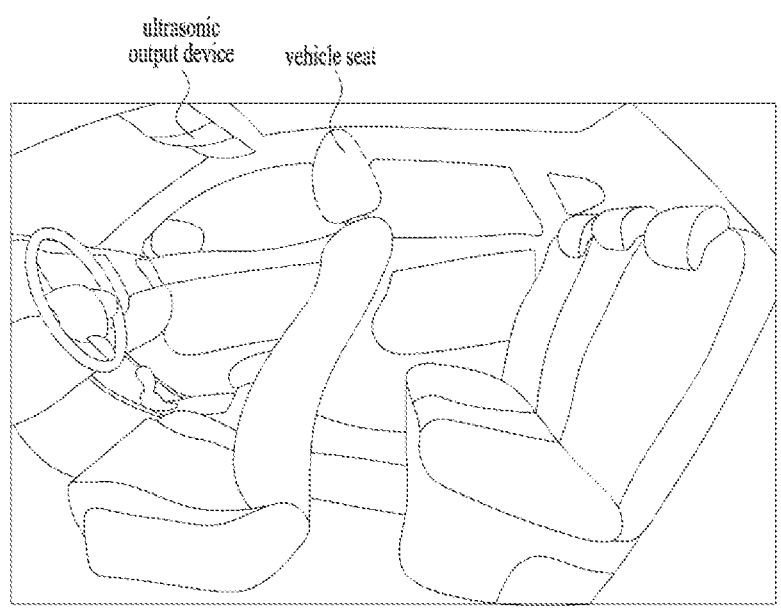
FIG. 3 is a flowchart illustrating a method for removing fine dust from the inside air of a vehicle according to an embodiment of the present disclosure.

FIG. 3 is a flowchart illustrating a method for removing fine dust from the inside air of a vehicle according to an embodiment of the present disclosure.

Referring to FIG. 3, the vehicle seat 131 may be vibrated to remove fine dust accumulated on the surface of the seat. The vehicle seat 131 may remove (or dust off) fine dust from the surface of the seat through the forward/backward movement thereof.

In order to remove fine dust from the entire seat, the vehicle seat 131 may perform at least one of a headrest height adjustment function, a backrest position adjustment function, a backrest angle adjustment function, a seat movement adjustment function in forward and backward directions, a seat height adjustment function, a seat inclination adjustment function, a seat depth adjustment function, and a backrest width adjustment function.

According to an embodiment, the vehicle seat 131 may include an air cushion. The vehicle seat 131 may remove fine dust accumulated on the seat surface through vibration of the air cushion.

On the other hand, the ultrasonic output device 132 of the vehicle decontamination system may be disposed at a ceiling inside the vehicle. The ultrasonic output device 132 may be disposed on the vehicle seat 131. In this case, the ultrasonic output device 132 may be disposed to correspond to the front seat of the vehicle, and/or may be disposed to correspond to the back seat of the vehicle.

According to the present embodiment, although one ultrasonic output device 132 can be disposed at the front seat of the vehicle and one ultrasonic output device 132 can be disposed at the back seat of the vehicle for convenience of description, the number of ultrasonic output devices 132 is not limited thereto.

The ultrasonic output device 132 may operate at a preset frequency in order to aggregate fine dust inside the vehicle. The ultrasonic output device 132 may output a frequency of 20 to 30 kHz to the outside, and preferably, the ultrasonic output device 132 may output a frequency of 28 kHz.

According to an embodiment, the ultrasonic output device 132 may operate for a preset time period to aggregate fine dust.

When the ultrasonic output device 132 operates for 30 seconds, the fine dust particles may be aggregated. After initial aggregation of the fine dust particles, the ultrasonic output device 132 operates for 1 minute so that the size of aggregated fine dust can be increased to a preset size.

In this case, the size of the aggregated fine dust may be a size with which the aggregated fine dust can drop to the floor of the vehicle due to gravity. For example, the aggregated fine dust may have the size of 1 mm.

Figure 4:
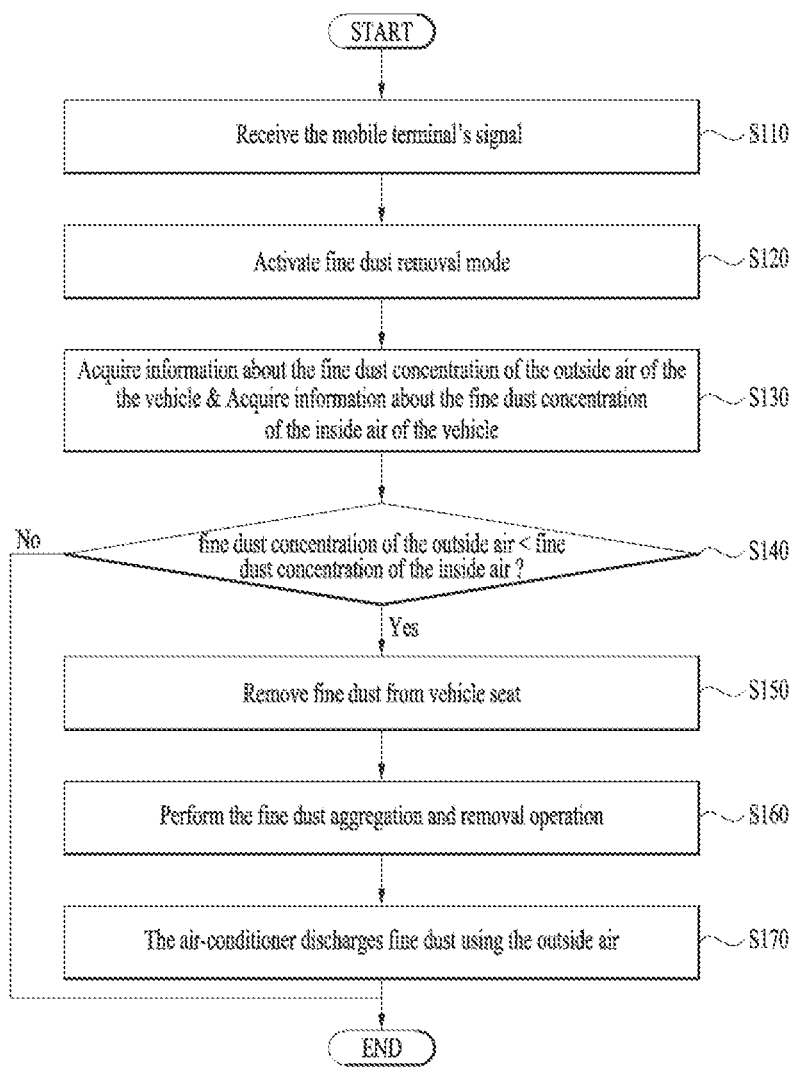
FIG. 4 is a flowchart illustrating a method for removing fine dust from the inside air of the vehicle from among vehicle decontamination methods according to an embodiment of the present disclosure.

FIG. 4 is a flowchart illustrating a method for removing fine dust from the inside air of the vehicle from among vehicle decontamination methods according to an embodiment of the present disclosure.

Referring to FIG. 4, the controller 121 may receive a fine dust removal request from the mobile terminal through the communication unit (S110).

After execution of step S110, the controller 121 may activate the fine dust removal mode in response to the fine dust removal request (S120).

After execution of step S120, the controller 121 may receive information about the fine dust concentration of the outside air of the vehicle from the Meteorological Agency server, and may receive information about the fine dust concentration of the inside air of the vehicle from the fine dust sensor 111 (S130).

After execution of step S130, the controller 121 may compare the fine dust concentration of the outside air of the vehicle with the fine dust concentration of the inside air of the vehicle. The controller 121 may determine whether the fine dust concentration of the inside air of the vehicle exceeds the fine dust concentration of the outside air of the vehicle (S140).

After execution of step S140, when the fine dust concentration of the inside air of the vehicle exceeds the fine dust concentration of the outside air of the vehicle, the controller 121 may control the vehicle seat 131 to perform the fine dust removal operation. When the fine dust removal operation for the vehicle seat 131 is applied to the front seats (e.g., a driver seat and a passenger seat) of the vehicle, the operation for automatically moving the driver seat and the passenger seat in forward and backward directions, the operation for automatically moving the backrest angle in forward and backward directions, and the self-vibration operation can be performed (S150). In addition, when the fine dust removal operation for the vehicle seat 131 is applied to the back seats of the vehicle, the self-vibration operation of the back seats and the operation of the ventilation device can be performed (S150).

After execution of step S150, the controller 121 may control the ultrasonic output unit 132 to perform the fine dust aggregation and removal operation. To this end, the ultrasonic output device 132 may output ultrasonic waves of a preset frequency for fine dust aggregation from the front seat and the back seat of the vehicle (S160).

After execution of step S160, the controller 121 may control the air-conditioner 134 to discharge the air including fine dust. The air-conditioner 134 may discharge fine dust aggregated in the vehicle to the outside of the vehicle by utilizing the outside air (S170). After discharging fine dust to the outside of the vehicle, the controller 121 may finish the fine dust removal mode.

FIG. 5 is a flowchart illustrating a sterilization/deodorization method from among vehicle decontamination methods according to an embodiment of the present disclosure.

Referring to FIG. 5, the controller 121 may receive a sterilization/deodorization request from the mobile terminal through the communication unit (S210).

After execution of step S210, the controller 121 may activate the sterilization/deodorization mode in response to the sterilization/deodorization request (S220).

After execution of step S220, the controller 121 may receive water level information stored in the housing located in the steam supply device 133 (S230).

After execution of step S230, the controller 121 may compare the water level information of the steam supply device 133 with the capacity of the housing, and may determine whether the water level exceeds ⅓ of the housing capacity (S240).

After execution of step S240, when the water level does not exceed ⅓ of the housing capacity, the controller 121 may control the steam supply device to output a message for indicating a water shortage through a notification unit (S245). After outputting the message for water shortage notification, the controller 121 may finish the sterilization/deodorization mode.

On the other hand, after execution of step S240, when the water level exceeds ⅓ of the housing capacity, the controller 121 may control the steam supply device 133 to heat water using a heater to generate steam (S250).

After execution of step S250, the controller 121 may control the air-conditioner 134 to spray the steam into the vehicle (S260). The air-conditioner 134 may spray steam to all parts of the interior space of the vehicle through the existing air-conditioning unit for cooling/heating the inside air of the vehicle.

After execution of step S260, the controller 121 may receive the humidity information of the inside air of the vehicle through the humidity sensor 113, and may heat the inside air of the vehicle through the air-conditioner 134 in a manner that the inside air of the vehicle can reach the optimum humidity in response to the received humidity information.

After execution of step S270, the controller 121 may receive odor information of the inside air of the vehicle through the olfactory sensor 112, and may determine the odor level based on the received odor information (S280).

After execution of step S280, the controller 121 may operate the air-conditioner 134 based on the odor level (S290). When the odor level is less than or equal to a preset odor level, the controller 121 may finish the sterilization/deodorization mode. When the odor level of the inside air of the vehicle is greater than a preset odor level, the controller 121 may control the air-conditioner 134 to deodorize the inside air of the vehicle.

In the above-described embodiments, the vehicle having received a message for indicating the necessity of vehicle decontamination may transmit the decontamination mode result to the mobile terminal of the user after finishing the decontamination mode, so that the pollution level of the vehicle can be managed.

In another aspect of the present disclosure, the above-described proposal or operation of the present disclosure may be provided as codes that may be implemented, embodied or executed by a "computer" (System on Chip (SoC)), an application storing or containing the codes, a computer-readable storage medium, a computer program product, and the like, which also comes within the scope of the present disclosure.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Accordingly, the present disclosure is not intended to be limited to the embodiments shown herein, but to be given the broadest scope that matches the principles and novel features disclosed herein.

As is apparent from the above description, the embodiments of the present disclosure can allow a user of the vehicle to effectively manage the vehicle by recognizing the degree of air pollution of vehicle, so that the vehicle and personal hygiene management can be effectively implemented.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for performing vehicle decontamination comprising:
   receiving a decontamination request signal;
   monitoring a pollution level of inside air of a vehicle through a sensing unit that includes a fine dust sensor, an olfactory sensor, and a humidity sensor, responsive to the decontamination request signal;
   determining from the sensing unit whether decontamination of the inside air of the vehicle is necessary; and
   when decontamination of the inside air of the vehicle is determined from the sensing unit to be necessary, performing a decontamination mode of operation through a driving unit that includes a vehicle seat, an ultrasonic output device, an air-conditioner, and a steam supply device.

2. The method according to claim 1, wherein receiving the decontamination request signal includes:
   receiving at least one of a fine dust removal request and a sterilization/deodorization request.

3. The method according to claim 2, further comprising:
   when the decontamination request signal includes the fine dust removal request,
   measuring information from the fine dust sensor on fine dust concentration of the inside air of the vehicle; and
   receiving information from a meteorological agency server on fine dust concentration of outside air of the vehicle.

4. The method according to claim 3, wherein determining whether decontamination of the inside air of the vehicle is necessary includes:
   when the fine dust concentration of the inside air of the vehicle exceeds the fine dust concentration of the outside air of the vehicle, determining that fine dust removal is necessary.

5. The method according to claim 4, wherein the performing of the decontamination mode includes:
   performing, by the vehicle seat, a fine dust removal operation;
   outputting, by the ultrasonic output device, ultrasonic waves in a manner such that the fine dust is aggregated; and
   discharging, by the air-conditioner, the aggregated fine dust to outside the vehicle.

6. The method according to claim 2, further comprising:
   upon receiving the sterilization/deodorization request, detecting a water level of the steam supply device.

7. The method according to claim 6, wherein the determining of whether decontamination of the inside air of the vehicle is necessary includes:
   when the water level of the steam supply device exceeds a predetermined threshold, determining that sterilization and deodorization of the inside air of the vehicle are possible.

8. The method according to claim 6, wherein the performing the decontamination mode of operation includes:
   generating, by the steam supply device, steam by heating water;
   spraying, by the air-conditioner, the generated steam into the vehicle; and
   heating, by the air-conditioner, the inside air of the vehicle in such a manner that the air-conditioner allows the heated air to have a preset humidity based on humidity information measured by the humidity sensor.

9. The method according to claim 8, further comprising:
   when the air-conditioner performs adjustment for the preset humidity,
   measuring, by the olfactory sensor, an odor level of the inside air of the vehicle; and
   deodorizing, by the air-conditioner, the inside air of the vehicle based on the measured odor level.

10. The method according to claim 6, wherein the determining of whether decontamination of the inside air of the vehicle is necessary includes:
    when a water level of the steam supply device does not exceed a predetermined threshold, outputting a message for indicating a water shortage of the steam supply device.

11. A vehicle decontamination system comprising:
    a communication unit configured to receive a decontamination request signal;
    a sensing unit configured to monitor a pollution level of inside air of a vehicle based on the decontamination request signal; and
    a controller configured to determine whether decontamination of the inside air of the vehicle is necessary according to the decontamination request signal, and to control a driving unit and the communication unit to perform a decontamination mode when decontamination of the inside air of the vehicle is determined to be necessary, wherein:
the sensing unit includes a fine dust sensor, an olfactory sensor, and a humidity sensor, and
the driving unit includes a vehicle seat, an ultrasonic output device, an air-conditioner, and a steam supply device.

12. The system according to claim 11, wherein:
the controller is configured to receive at least one of a fine dust removal request and a sterilization/deodorization request.

13. The system according to claim 12, wherein:
upon receiving the fine dust removal request,
the controller is configured to:
measure information on fine dust concentration of the inside air of the vehicle through the fine dust sensor; and
receive information on fine dust concentration of outside air from a meteorological agency server through the communication unit.

14. The system according to claim 13, wherein:
when the fine dust concentration of the inside air of the vehicle exceeds the fine dust concentration of outside air of the vehicle, the controller is configured to determine that fine dust removal is necessary.

15. The system according to claim 14, wherein:
the controller is configured to:
control the vehicle seat to perform a fine dust removal operation;
control the ultrasonic output device to output ultrasonic waves in such a manner that the fine dust is aggregated; and
control the air-conditioner to discharge the aggregated fine dust to outside the vehicle.

16. The system according to claim 12, wherein:
upon receiving the sterilization/deodorization request, the controller is configured to detect a water level of the steam supply device.

17. The system according to claim 16, wherein:
when the water level of the steam supply device exceeds a predetermined threshold, the controller is configured to determine that sterilization and deodorization of the inside air of the vehicle are possible.

18. The system according to claim 16, wherein:
the controller is configured to:
control the steam supply device to generate steam by heating water;
control the air-conditioner to spray the generated steam into the vehicle; and
control the air-conditioner to heat the inside air of the vehicle in such a manner that the air-conditioner allows the heated air to have a preset humidity based on humidity information measured by the humidity sensor.

19. The system according to claim 18, wherein:
when the air-conditioner performs adjustment for the preset humidity,
the controller is configured to:
control the olfactory sensor to measure an odor level of the inside air of the vehicle; and
control the air-conditioner to deodorize the inside air of the vehicle based on the measured odor level.

20. The system according to claim 16, wherein:
when a water level of the steam supply device does not exceed a predetermined threshold, the controller is configured to output a message for indicating a water shortage of the steam supply device.

* * * * *